April 12, 1949. E. LUMSDEN 2,467,266
REARVIEW DEVICE HAVING THREE
CONNECTED MOVABLE MIRRORS
Filed Jan. 25, 1946 2 Sheets-Sheet 1
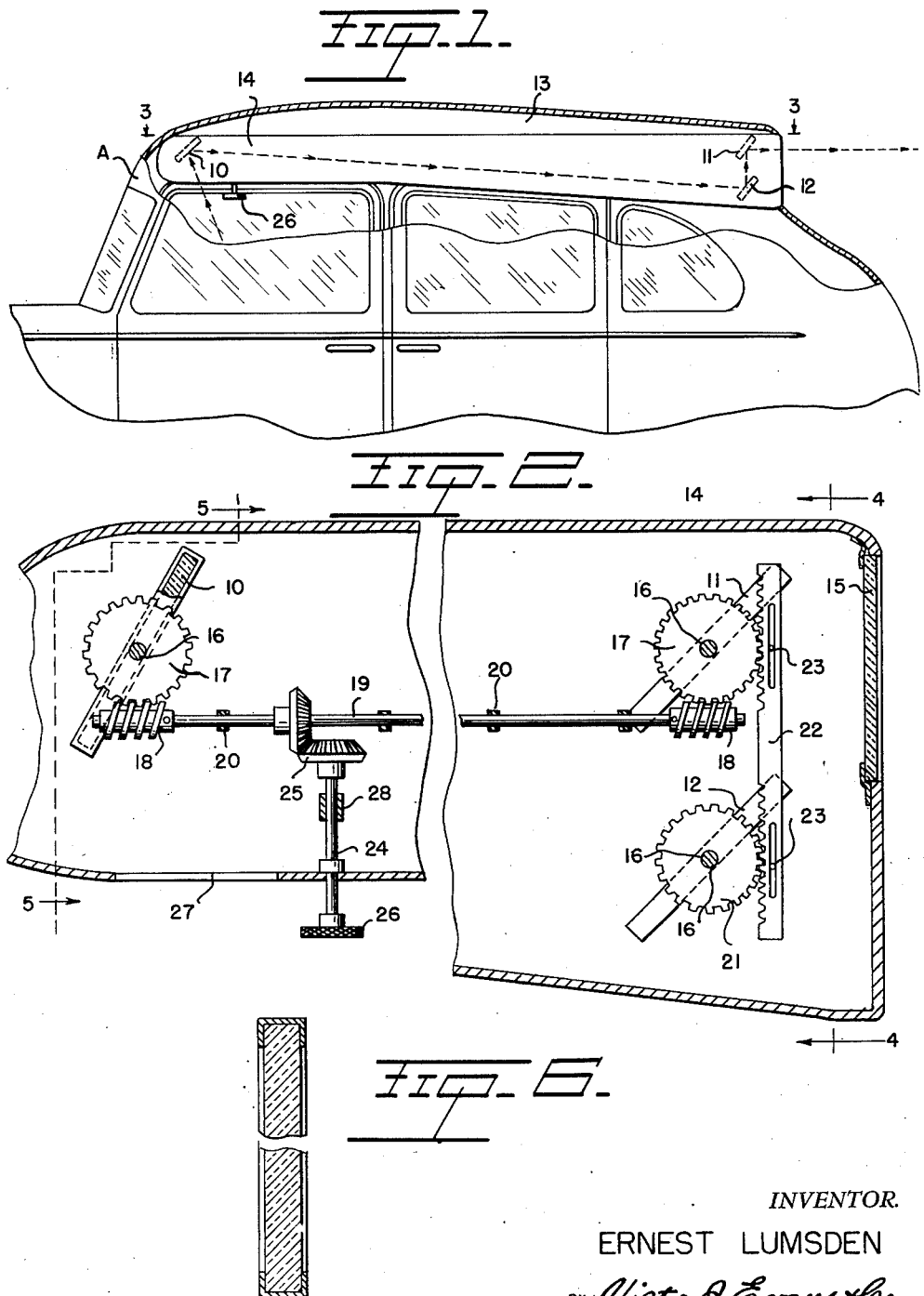
*INVENTOR.*
ERNEST LUMSDEN
BY *Victor J. Evans & Co.*
ATTORNEYS

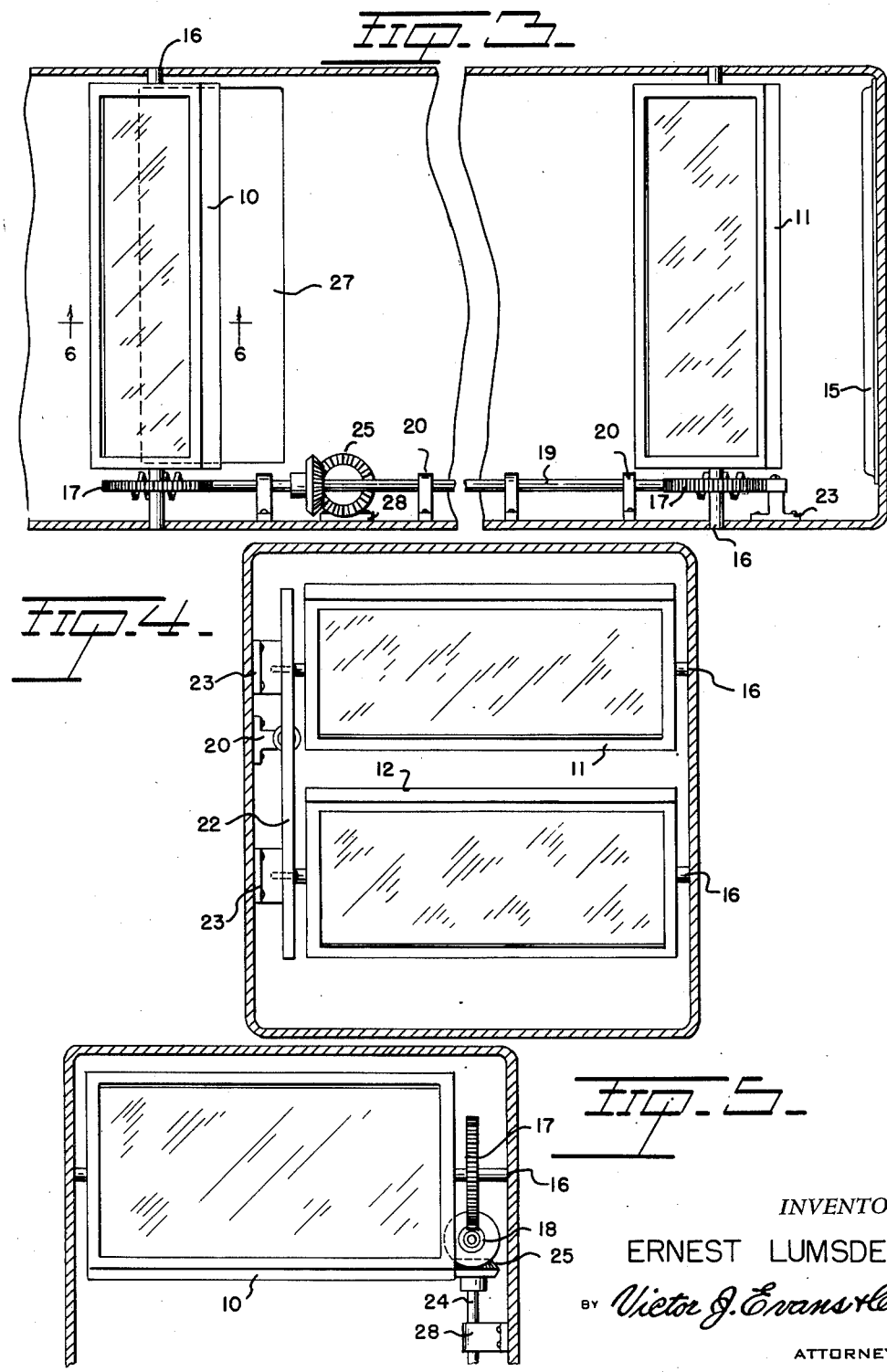

Patented Apr. 12, 1949

2,467,266

UNITED STATES PATENT OFFICE 2,467,266

REARVIEW DEVICE HAVING THREE CONNECTED MOVABLE MIRRORS

Ernest Lumsden, Cleveland, Ohio

Application January 25, 1946, Serial No. 643,398

1 Claim. (Cl. 88—86)

The invention relates to a rearscope for vehicular service and more especially to a rearview vision device.

The primary object of the invention is the provision of a device of this character wherein the same when installed within a vehicle or the like there can be obtained a rear vision so that an operator of such vehicle can ascertain oncoming traffic from the rear of the said vehicle and thus eliminate accidents, the device being of novel construction and is unique in the application thereof within the vehicle giving a wide range rear vision to the operator.

Another object of the invention is the provision of a device of this character, wherein adjustment thereof can be had for near or distant rear vision, the adjustment being manually effected from within the vehicle where installed.

A further object of the invention is the provision of a device of this character, which is simple in construction, thoroughly reliable and effective in operation, strong, durable, readily and easily adjusted, conveniently accessible, does not detract from the appearance of the vehicle where installed, possessed of few parts, thus economical in repairs and replacements, and inexpensive to manufacture and install.

With these and other objects in view the invention consists in the features of construction, combination and arrangement of parts as will be hereinafter more fully described, illustrated in the accompanying drawings, which disclose the preferred embodiment of the invention, and pointed out in the claim hereunto appended.

In the accompanying drawings:

Figure 1 is a fragmentary side view of a vehicle showing the device constructed in accordance with the invention installed therein;

Figure 2 is a mutilated vertical longitudinal sectional view through the device;

Figure 3 is a horizontal sectional view taken approximately on the line 3—3 of Figure 1 looking in the direction of the arrows;

Figure 4 is a sectional view on the line 4—4 of Figure 2 looking in the direction of the arrows;

Figure 5 is a sectional view on the line 5—5 of Figure 2 looking in the direction of the arrows;

Figure 6 is a detail sectional view taken on the line 6—6 of Figure 3 looking in the direction of the arrows.

Similar reference characters indicate corresponding parts throughout the several views in the drawings.

Referring to the drawing in detail, A designates generally a portion of a motor vehicle, in this instance of the sedan type, and within this vehicle is located the device constituting the present invention as hereinafter set forth in detail.

The invention constituting the present device, comprises front and rear overhead rotatable mirrors 10, 11, and 12, respectively, which are arranged within the vehicle close to the roof area 13 thereof and inside of a tunnel formation 14 having a rear transparent glass window 15 located at the rear end of such vehicle A.

The mirrors 10, 11 and 12 are turnable on horizontal arbors 16, which are disposed crosswise of the tunnel formation 14, fore and aft thereof. The arbors 16 for the rear mirrors 11 and 12, are vertically aligned in spaced superposed relation to each other. On the arbors 16 for the front and uppermost rear mirrors 10 and 11 respectively are fixed worm gears 17 meshing with worm pinions 18, which are fixed to a coupling shaft 19, journaled in suitable bearings 20 thereof, so that when this shaft 19 is rotated the mirrors 10 and 11 will turn in unison with each other.

The arbor 16 for the mirror 12 is fitted with a gear 21 and this with the gear 17 on the arbor of the mirror 11 mesh with a toothed rack bar 22, which is movably supported on guides 23, so that when the mirror 11 is turned the mirror 12 simultaneously turns therewith and at the same angle to the vertical, this angle also being true with respect to the front mirror 10.

Arranged above the head of the operator of the vehicle A is a vertically disposed adjusting shaft 24 which through the meshing gearing 25 with the shaft 19 enables the rotation of the latter, the shaft 24 being provided with a hand actuated turning wheel or knob 26 at its lower end in convenient reach of the said operator of the vehicle so that the mirrors can be turned in unison on their horizontal arbors and in this way near or distant rear vision can be had through the rear window 15, the vision being reflected from the rear mirrors 11 and 12, to the front mirror 10, as clearly indicated in Figure 1 of the drawings by the dotted lines appearing therein. The flooring to the tunnel formation 14 has a sight opening 27 clearing the front mirror 10 to the operator of the vehicle A.

The shaft 24 is supported and has bearing in a hanger 28.

What is claimed is:

A rear view vision device for vehicles comprising two mirrors, means for securing the mirrors for rotatable adjustment to a vehicle, said mirrors being located one above the other and the upper mirror adapted to receive the view from the rear of the vehicle, said lower mirror adapted to receive the object from the upper mirror, shafts upon which the upper and lower mirrors are mounted, gears on the said shafts, a vertically disposed rack having teeth meshing with said gears, said rack having elongated slots therein, guides positioned in said slots for holding the rack in mesh with the gears, a forward mirror device adapted to be connected to the vehicle for rotational adjustment, a shaft upon which the said forward mirror is mounted, a gear on the shaft of the forward mirror, a coupling shaft extended from the forward mirror to the mirrors positioned to receive the view from the rear of the vehicle, worm gears on the coupling shaft positioned to mesh with the gear of one of the rear mirrors and the gear of the forward mirror respectively, and manual means associated with said last mentioned driving connection including a gear on the coupling shaft mounted intermediate of the length of the shaft, and a vertically disposed shaft with a handle on the lower end and having a gear thereon meshing with the gear positioned on an intermediate point of the said coupling shaft for adjusting the mirrors simultaneously.

ERNEST LUMSDEN.

REFERENCES CITED

The following references are of record in the file of this patent:

UNITED STATES PATENTS

| Number | Name | Date |
| --- | --- | --- |
| 1,386,913 | Trabue | Aug. 9, 1921 |
| 1,844,438 | Paxton | Feb. 9, 1932 |
| 2,197,280 | Topping | Apr. 16, 1940 |
| 2,221,449 | Hoeninghausen | Nov. 12, 1940 |

FOREIGN PATENTS

| Number | Country | Date |
| --- | --- | --- |
| 608,849 | France | Apr. 30, 1926 |